(12) United States Patent
Siekierka et al.

(10) Patent No.: US 11,935,415 B2
(45) Date of Patent: Mar. 19, 2024

(54) METHOD FOR ASSISTING AN OCCUPANT IN EXITING A VEHICLE, TAKING INTO ACCOUNT FOLLOWING OBJECTS, COMPUTING DEVICE, AND DRIVER ASSISTANCE SYSTEM

(71) Applicant: Bayerische Motoren Werke Aktiengesellschaft, Munich (DE)

(72) Inventors: Tomasz Siekierka, Munich (DE); Werner Tschoepe, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 23 days.

(21) Appl. No.: 17/801,202

(22) PCT Filed: Dec. 15, 2020

(86) PCT No.: PCT/EP2020/086079
§ 371 (c)(1),
(2) Date: Aug. 19, 2022

(87) PCT Pub. No.: WO2021/164920
PCT Pub. Date: Aug. 26, 2021

(65) Prior Publication Data
US 2023/0074621 A1 Mar. 9, 2023

(30) Foreign Application Priority Data
Feb. 20, 2020 (DE) .................... 10 2020 104 535.2

(51) Int. Cl.
*G08G 1/16* (2006.01)
*B60Q 9/00* (2006.01)
(Continued)

(52) U.S. Cl.
CPC ............... *G08G 1/166* (2013.01); *B60Q 9/00* (2013.01); *B60R 21/0134* (2013.01); *G06F 18/24* (2023.01)

(58) Field of Classification Search
CPC .......... G08G 1/166; G08G 1/167; B60Q 9/00; B60Q 1/324; B60R 21/0134; G06F 18/24
See application file for complete search history.

(56) References Cited

U.S. PATENT DOCUMENTS 10,086,833 B1 * 10/2018 Duan .................. G01S 17/87
2007/0188312 A1 * 8/2007 Bihler .................. E05B 77/12
701/49

FOREIGN PATENT DOCUMENTS

DE 10 2005 014 581 A1 9/2006
DE 10 2005 021 142 A1 11/2006
(Continued)

OTHER PUBLICATIONS

PCT/EP2020/086079, International Search Report dated Apr. 30, 2021 (Three (3) pages).
(Continued)

*Primary Examiner* — Omeed Alizada
(74) *Attorney, Agent, or Firm* — Crowell & Moring LLP

(57) ABSTRACT

A method for assisting an occupant exiting a vehicle includes: receiving opening data describing an imminent opening of a door of the vehicle; receiving object data describing positions and speeds of objects in the vehicle environment; determining a time-to-collision between the opening of the door and a possible collision of a first object with the door, based on the opening data and the object data; outputting an urgent warning signal if the time-to-collision falls below a predetermined minimum duration; using the object data to check whether the first object is followed by a second object; classifying the second object as a first following object if a time-gap between the first object and
(Continued)

the second object is below a predetermined limit; and outputting a warning signal after the output of the urgent warning signal in the event that the second object is classified as the first following object.

10 Claims, 3 Drawing Sheets

(51) Int. Cl.
*B60R 21/0134* (2006.01)
*G06F 18/24* (2023.01)

(56) References Cited

FOREIGN PATENT DOCUMENTS

| | | |
|---|---|---|
| DE | 10 2011 079 003 A1 | 1/2013 |
| DE | 10 2011 115 740 A1 | 4/2013 |
| DE | 10 2014 010 654 A1 | 1/2015 |
| DE | 10 2017 113 596 A1 | 12/2017 |
| DE | 10 2018 114 331 A1 | 12/2018 |
| EP | 1 375 267 A2 | 1/2004 |
| EP | 3 594 035 A1 | 1/2020 |

OTHER PUBLICATIONS

German Search Report issued in German application No. 10 2020 104 535.2 dated Jul. 17, 2020, with Statement of Relevancy (Nine (9) pages).

\* cited by examiner

METHOD FOR ASSISTING AN OCCUPANT IN EXITING A VEHICLE, TAKING INTO ACCOUNT FOLLOWING OBJECTS, COMPUTING DEVICE, AND DRIVER ASSISTANCE SYSTEM

BACKGROUND AND SUMMARY OF THE INVENTION

The present invention relates to a method for assisting an occupant in exiting a vehicle. Furthermore, the invention relates to a computing device for a driver assistance system of a vehicle and to such a driver assistance system. In addition, the present invention relates to a computer program.

Different driver assistance systems are known from the prior art, which assist an occupant or driver in operating the vehicle. Driver assistance systems that assist an occupant in exiting the vehicle are particularly relevant in this case. Such driver assistance systems, also known as exit warning systems, usually comprise a sensor that can be used to detect an opening of a vehicle door by the occupant. Furthermore, these driver assistance systems have at least one environment sensor, which can be used to detect objects or other road users in the area surrounding the vehicle. Depending on the objects detected, the occupant can then be warned, thereby preventing a collision between the open door and an object.

In this context, EP 1 375 267 A2 describes a method for detecting an accident hazard in which distance sensors of a vehicle are used to detect objects in the detection ranges in front of and/or behind the vehicle. Furthermore, distances between objects in front of and/or behind the vehicle are determined from the distance signals while the vehicle is moving, and when the vehicle is stationary a risk of collision of the object with an opening vehicle door of the vehicle is determined.

In known driver assistance systems for exit warning, a time to collision between opening the door and a possible collision of an object with the door can also be determined. Depending on this time to collision, either a warning or an urgent warning can then be output. However, if, for example, objects or other road users are constantly moving past the vehicle in heavy traffic, the case can arise that the urgent warning is output all the time. This can disturb the occupants, but also cause them to become unsettled.

The object of the present invention is to present a solution in which a method for assisting an occupant when exiting a vehicle of the type mentioned above can be reliably adapted to the current traffic situation.

This object is achieved according to the invention by means of a method, a computing device, a driver assistance system, and by a computer program having the features in accordance with the independent claims. Advantageous extensions of the present invention are specified in the dependent claims.

A method according to the invention is used to assist an occupant when exiting a vehicle. The method comprises receiving opening data describing the imminent opening of a vehicle door by the occupant. In addition, the method comprises receiving object data that describes positions and speeds of objects in an environment of the vehicle. The method also comprises determining a time to collision between opening the door and a possible collision of a first object with the door based on the opening data and the object data, and outputting an urgent warning signal if the time to collision falls below a predetermined minimum duration. In addition, the method comprises using the object data to check whether the first object is followed by a further object, classifying the further object as a following object if a time gap between the first object and the further object is below a predetermined limit, and outputting a warning signal after the output of the urgent warning signal in case the further object is classified as a following object.

The purpose of the method is to assist an occupant of the vehicle when exiting the vehicle. This method can in particular be carried out after the vehicle has been stopped or parked. The occupant may be in a driver's seat, a front passenger seat, or a rear seat of the vehicle. In principle, the method can be used by all occupants when exiting the vehicle. The method can be carried out using a computing device of a driver assistance system of the vehicle. This computing device, which can be formed by an electronic control unit of the vehicle, for example, can receive the opening data. The opening data can be acquired using at least one sensor on the vehicle. The sensor can detect, for example, the opening of a door contact and/or touching of a handle to open the door. Alternatively or in addition, the sensor can be a camera which can be used to detect the movements of the occupant. The opening data can be appropriately evaluated with the computing device and used to detect that the occupant is opening or would like to open the door. Furthermore, the opening data can be used to determine an (expected) time when the door will be opened.

In addition, the computer receives the object data that describes objects in the environment of the vehicle. In particular, the object data describes the positions and speeds of the objects. The object data can be provided using an environment sensor or a plurality of environment sensors of the vehicle. The environment sensor can be a distance sensor that continuously determines the distance between the vehicle and the object. The speed of the object can then be derived from this. In addition to measuring the distance or position, the environment sensor can preferably also be used to measure the speed of the object. The environment sensor can be implemented, in particular, as a radar sensor. Using the object data, it is then possible to check using the computing device whether objects are located in the area around the vehicle. The objects may be other road users, such as vehicles or cyclists.

The computing device can also be used to check whether there is a risk of a collision with the detected objects and the opening door. To do this, it is possible to check whether the object will move in a danger zone or a pivot range of the door. The computing device can also be used to determine the time to collision (TTC). The time to collision describes the time between opening the door and a possible collision between the object and the open door. If the time to collision exceeds the predetermined minimum duration, a warning signal can be output by means of the computing device. As a result of the warning signal that is emitted, a warning can be output to the occupant by means of a warning device of the driver assistance system. This warning can be purely visual, for example by activating a light element on an exterior mirror of the vehicle. However, if the time to collision is less than the predetermined minimum duration, the computing device can emit the urgent warning signal. In emitting the urgent warning signal, the warning device can then be used to output the urgent warning, the urgent warning being different from the warning. The urgent warning can be both visual and audible. For example, in the case of the urgent warning the light element on the exterior mirror can flash and an additional warning tone can be output.

For example, if an object is detected that is in danger of a collision after the vehicle has been parked, this can be classified as the first object. Depending on the time to collision, either the warning signal or the urgent warning signal can then be output. If the urgent warning signal is emitted or the urgent warning is output, it is also checked whether another object or another road user follows the first object. In other words, it is checked whether at least one further object is located behind the first object in the direction of travel which has the same direction of travel as the first object. The further object may be located in particular in the traffic lane of the first object. The time gap between the first object and the further object is also determined. The time gap describes the time interval in which two consecutive vehicles or objects pass a certain point. If the time gap falls below the predetermined limit value, the further object is classified as a following object.

If the further object is classified as a following object, the warning signal is output after the output of the urgent warning signal. This means in particular that the urgent warning is not output continuously, as long as the first object and the following object have passed the vehicle. Preferably, the urgent warning is output first, and once it is detected that a following object follows the first object, only the warning is output instead of the urgent warning. This is particularly suitable in the case of high traffic volumes, in which a large number of objects or vehicles traveling close together are moved past the vehicle.

According to the invention, in the case of a column of objects, the urgent warning is not output continuously for all objects traveling past in the column. In this context, the term "column" is understood to mean a continuous series of objects or vehicles in the traffic flow. In such a column, the urgent warning is output in particular only for the first object, and for the subsequent objects or following objects only the warning is output. Thus, in such a traffic situation, the occupant is not disturbed and/or unsettled by a continuous urgent warning.

A check is also preferably carried out to determine whether the following object is followed by a further object, wherein the further object is also classified as a following object if the time gap between the following object and a further object is below the predetermined limit. In other words, it can be checked whether the first object is followed by multiple following objects. The objects are classified as following objects if the respective time gap between the objects is less than the predetermined limit. This means that the warning can be output, in particular, provided the time gap between two directly consecutive objects does not exceed the limit. Thus, the permanent sounding of the urgent warning in the presence of a column of objects or vehicles can be reliably prevented.

In one embodiment the warning signal is output for as long as a following object is located in a predetermined danger zone in the environment of the vehicle. The danger zone can be defined within the environment of the vehicle. If there is an object located in this danger zone, there is a risk of a collision between the object and the opening or open door of the vehicle. The danger zone can be determined depending on which door or doors of the vehicle are opened. As already explained, one or more following objects can be detected. The warning signal can be emitted or the warning can be output until the last detected following object has left the danger zone. When the warning is no longer output, the column of objects has passed the vehicle and the occupant can safely exit the vehicle.

In another embodiment, the urgent warning signal is output for as long as the first object is located in the predetermined danger zone in the environment of the vehicle. As already explained, in the event of a column of objects passing the vehicle, the urgent warning is only output for the first object. In particular, it is provided that the urgent warning is output as long as the first object is within the danger zone. It may also be possible for the urgent warning signal to be issued for a predetermined duration after the first object has left the danger zone. This allows the occupant to be informed that there is when the door is opened or when exiting the vehicle. However, the occupant is not disturbed by a continuous urgent warning throughout the passage of the entire column.

It is also advantageous to output a warning signal if the time to collision for an object exceeds the predetermined minimum duration. As explained earlier, the urgent warning is output if the time to collision for an object falls below the predetermined minimum duration. However, if the time to collision exceeds the predetermined minimum duration, only the warning will be output. It may also be provided that when an object is detected with a time to collision below the minimum duration, the warning signal will be output until the object has left the danger zone. It may therefore be provided that switching from a warning to an urgent warning is avoided even if the object is moving towards the vehicle. If the warning signal is output for an object, it is also not checked, in particular, whether the object is followed by further following objects.

In another embodiment, the further object is prevented from being classified as a following object if the further object follows the first object and the time gap between the first object and the further object exceeds the predetermined limit, or if the further object follows a following object and the time gap between the following object and the further object exceeds the predetermined limit. If a first object is detected and the urgent warning is output, it is checked whether the first object is followed by following objects. In this case, although the first object may be followed by another object, the time gap is greater than the limit. In this case, the further object is not classified as a following object. Depending on the time to collision for this object, either the urgent warning or the warning can then be output. It may also be the case that one or more following objects were detected after the first object, but the time gap to another object that follows the last detected following object exceeds the limit. In this case also, this other object is not classified as a following object. This means it is possible to distinguish easily and reliably between a column of objects and individual objects that are not part of the column.

In another embodiment, using the object data, an object list is created to identify and/or classify the objects detected in the environment. An object list can therefore be created in which the respective detected objects are listed. A code or identifier can then be assigned to these individual objects. In addition, the objects in the list can be assigned a classification as a first object or as a following object. It may also be provided that based on the object data a digital environment map is generated that describes the objects and their positions. Information for the identification and/or classification can also be stored in the digital environment map for objects. Thus, the individual objects can be reliably identified and/or classified and so the warning can be output selectively.

A computing device according to the invention for a driver assistance system of a vehicle is designed to carry out a method according to the invention and its advantageous embodiments. The computing device can be formed, in particular, by an electronic control unit of a vehicle.

A driver assistance system according to the invention for a vehicle comprises a computing device according to the invention. In addition, the driver assistance system comprises at least one environment sensor for detecting objects in the environment of the vehicle. The at least one environment sensor can be used to provide the object data describing the objects in the environment of the vehicle. It can preferably also be provided that the driver assistance system has a plurality of environment sensors. The at least one environment sensor can be designed as a radar sensor. In addition, the driver assistance system comprises at least one sensor for detecting an imminent opening of a vehicle door. The at least one sensor can also be used to detect am intention to exit on the part of an occupant. The at least one sensor can detect an opening of a door contact, touching and/or actuation of a handle to open the door, or the like. Finally, the driver assistance system comprises a warning device for outputting a warning or an urgent warning.

A vehicle according to the invention comprises a driver assistance system according to the invention. In particular, the vehicle is designed as a passenger car.

Another aspect of the invention relates to a computer program that comprises commands which, when the computer program is executed by a computing device, cause it to carry out a method according to the invention and its advantageous embodiments. Furthermore, the invention relates to a computer-readable (storage) medium, comprising commands which, when executed by a computing device, cause the computer to carry out a method according to the invention and its advantageous embodiments.

The preferred embodiments presented with reference to the method according to the invention and its advantages apply mutatis mutandis to the computing device according to the invention, to the driver assistance system according to the invention, to the vehicle according to the invention, to the computer program according to the invention and to the computer-readable (storage) medium.

Additional features of the invention arise from the claims, the figures, and the description of the figures. The features and feature combinations cited in the description above, and the features and feature combinations cited in the description of the figures below and/or shown in the figures alone are applicable not only in the respective combination indicated but also in other combinations or in isolation, without departing from the scope of the invention.

The invention will now be described in greater detail based on preferred exemplary embodiments and by reference to the attached drawings, in which:

In the figures, identical or functionally equivalent elements are indicated by the same reference signs.

DETAILED DESCRIPTION OF THE DRAWINGS

Figure 1:
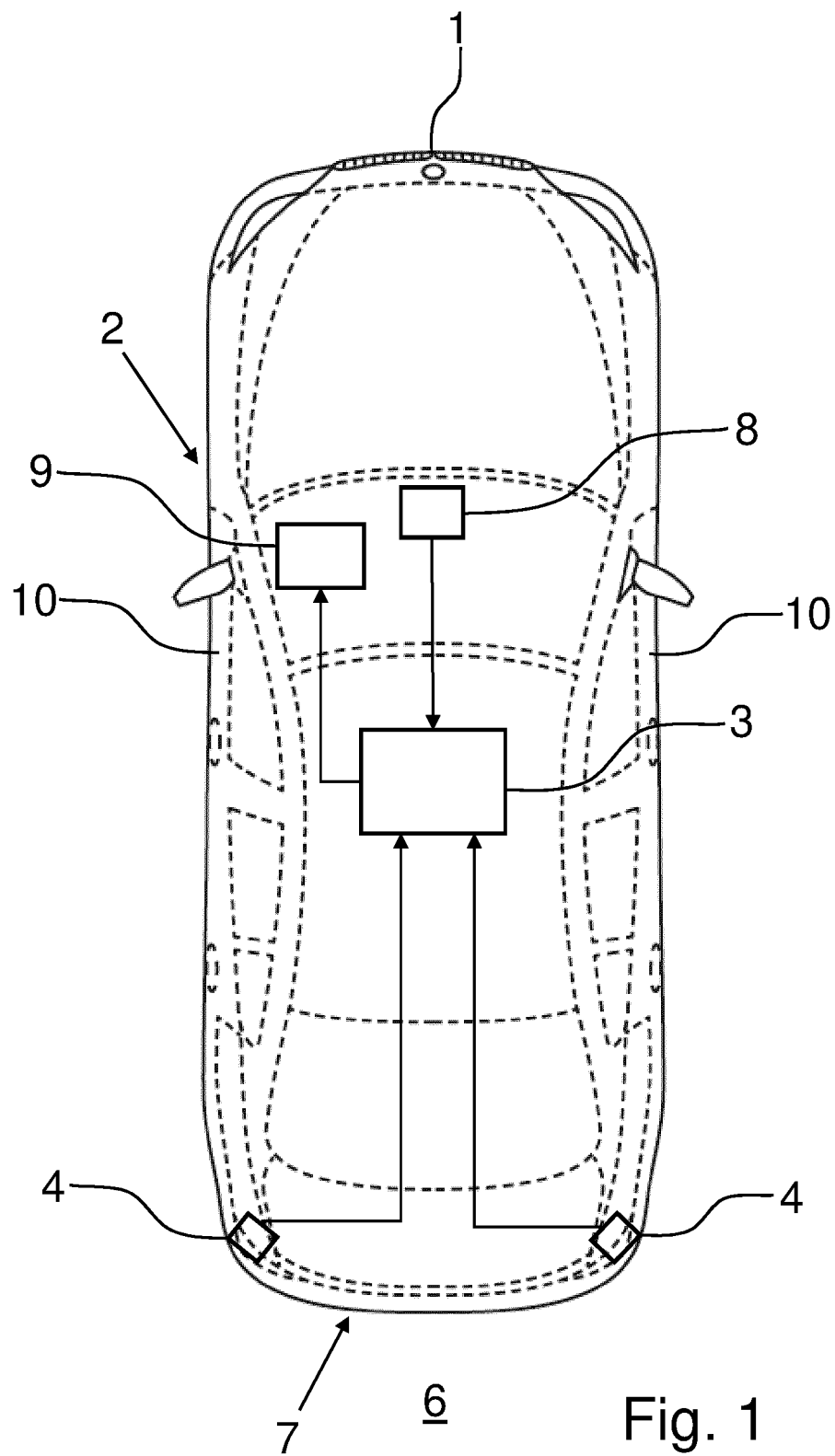
FIG. 1 shows a schematic representation of a vehicle equipped with a driver assistance system for assisting an occupant when exiting the vehicle.

FIG. 1 shows a schematic representation of a vehicle 1, in this case designed as a passenger car, in a plan view. The vehicle 1 comprises a driver assistance system 2 which is used to assist an occupant in exiting the vehicle 1. The driver assistance system 2 comprises a control device 3, which can be formed, for example, by an electronic control unit of the vehicle 1.

In addition, the driver assistance system 2 comprises at least one environment sensor 4 which can be used to detect objects 5 in an environment 6 of the vehicle 1. In this example, the driver assistance system 2 comprises two environment sensors 4, which are located in a rear section 7 of the vehicle 1. In particular, the environment sensors 4 can be used to determine a distance between the environment sensor 4 and the respective objects 5, as well as a speed of the respective objects 5. The environment sensors 4 can be designed in particular as radar sensors. The environment sensors 4 can be used to provide object data that describes the objects 5 in the environment 6. This object data can be transferred from the environment sensors 4 to the computing device 3.

In addition, the driver assistance system 2 comprises a sensor 8, only shown schematically here, which can be used to detect the opening of a door 10 of the vehicle 1. It may also be provided that the sensor 8 can be used to detect an intention to open the door, or a movement of the occupant towards the door 10. The sensor 8 can be used to provide opening data that describes the opening of the door 10 or the imminent opening of the door 10. This opening data can be transmitted from the sensor 8 to the computing device 3.

In addition, the driver assistance system 2 comprises a warning device 9 which can be used to output different warnings to the occupants. In particular, the warning device 9 can have a plurality of components with which audible and visual warnings can be output. The warning device 9 can be used to output a warning to the occupants. For this purpose, a light element in the door mirror that is assigned to the door 10 can be activated to emit light. In addition, an urgent warning can be output with the warning device 9. The light element in the door mirror can be activated to flash and an acoustic signal or warning tone can also be output in the interior of the vehicle 1. If a warning signal is emitted by the computing device 3, the warning device is output using the warning device and if an urgent warning signal is emitted with the computing device 3, the urgent warning is output using the warning device 9.

Figure 2:
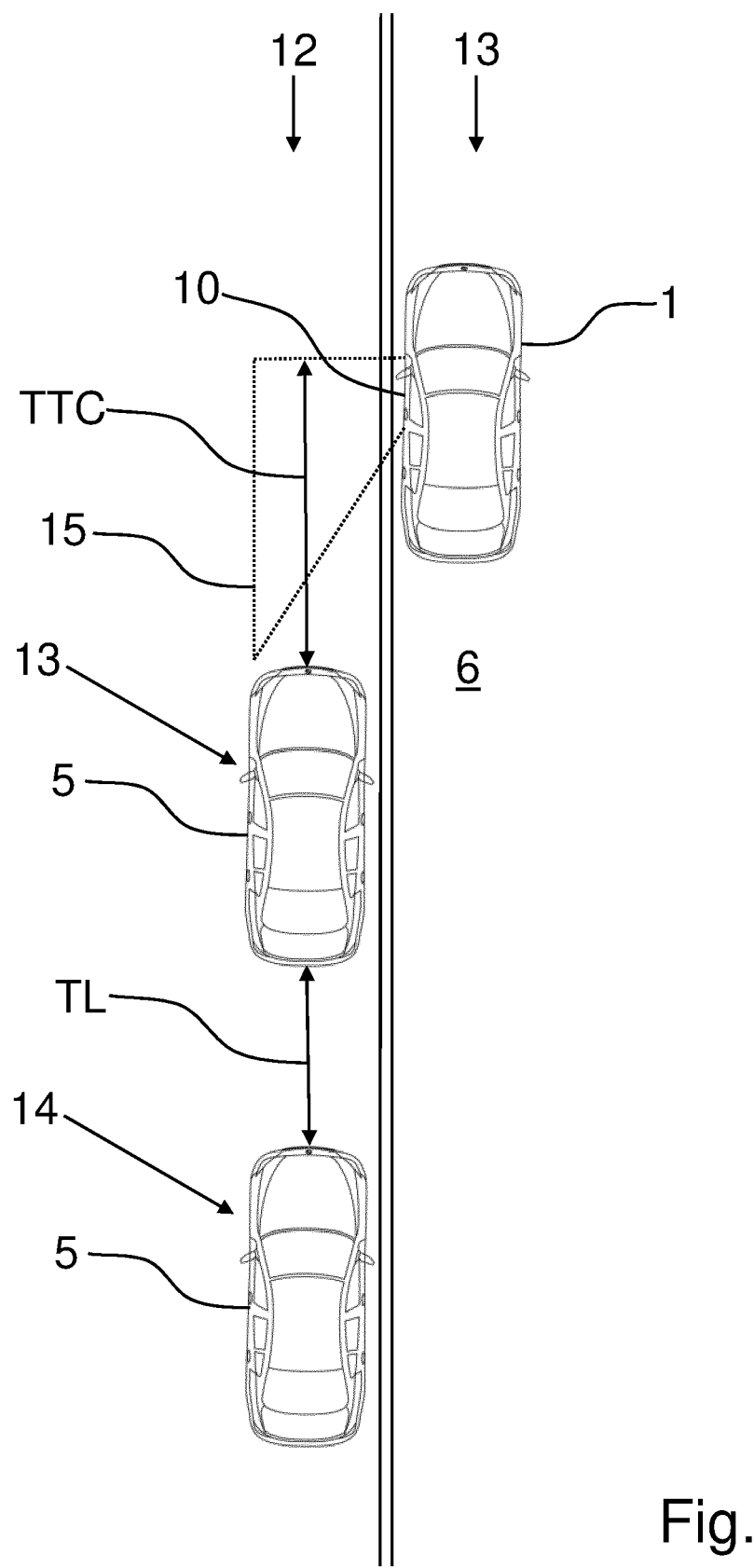
FIG. 2 shows a traffic situation in which the vehicle is parked and objects in the form of other vehicles are located in the environment of the vehicle.

FIG. 2 shows a schematic representation of a traffic situation in which the vehicle 1 is parked in a parking area 11. Here, the occupant, not shown in this drawing, who is seated in the driver's seat of the vehicle 1, would like to open the door 10. This imminent opening of the door 10 is detected by means of the computing device 3 on the basis of the opening data. Furthermore, the objects 5 in the environment 6 of the vehicle 1 can be detected by means of the computing device 3 using the object data. In the example shown, two objects 5 in the form of further vehicles are located on a traffic lane 12, which is adjacent to the parking area 11. These objects 5 are moving in the forward direction.

Using the object data, the position and speed of each of the objects 5 can be determined continuously by means of the computing device 3. Furthermore, using the computing device 3 a time to collision TTC between opening the door 10 and a possible collision of the object 5 with the door 10 can also be determined. This time to collision TTC is also compared with a predetermined minimum duration, which can be, for example, 2 s. If the time to collision TTC exceeds the minimum duration, the warning signal is output by the computing device 3. In this example, the time to collision TTC is less than the minimum duration. Therefore, the urgent warning signal is issued by means of the computing device 3.

If the urgent warning signal is issued or the urgent warning is output using the computing device 3, the object 5, on account of which the urgent warning is output, is classified as the first object 13. It is also checked whether this first object 13 is followed by a further object 5. In the example shown, the first object 13 is followed by a further object 5. Based on the object data, a time gap TL between the first object 13 and the following object 5 is determined by means of the computing device 3. If the time gap TL falls below a limit, which can be 2 s, for example, the further object 5 is classified as a following object 14. In the present traffic situation, the further object 5 or the vehicle behind is classified as the following object 14. If the following object 14 is detected after the first object 13, the urgent warning is output for as long as the first object 13 is located in a predetermined danger zone 15. If the first object 13 has left the danger zone 15, an urgent warning is not output for the following object 14, but only a warning.

Figure 3:
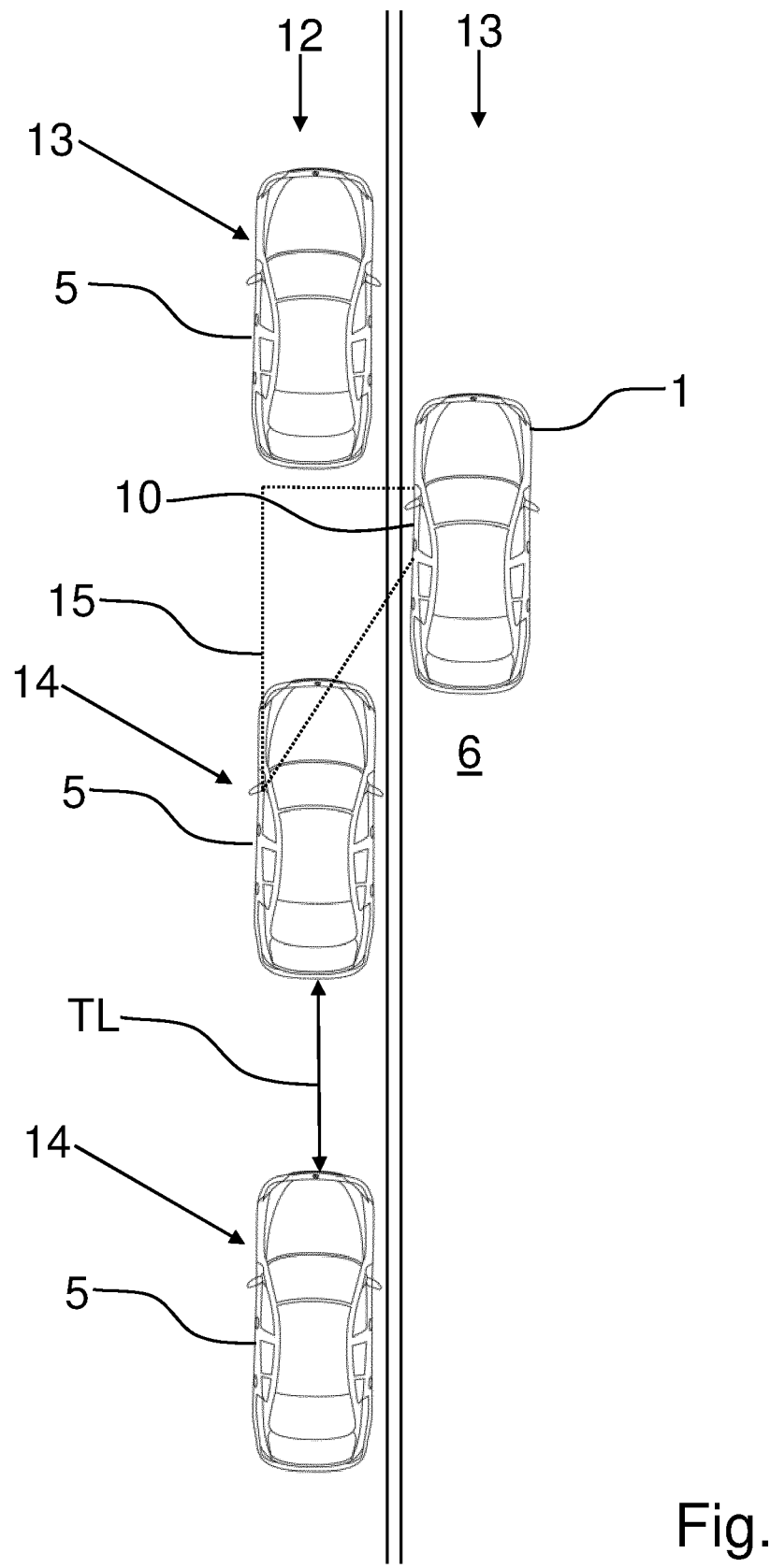
FIG. 3 shows the traffic situation according to FIG. 2 at a later time.

FIG. 3 shows the traffic situation according to FIG. 2 at a later time. Here, the first object 13 has already left the danger zone 15. In this case, the warning is output due to the following object 14. In the direction of travel, a further object 5 is located behind the following object 14. Here, the time gap between the following object 14 and the further object 5 is determined on the basis of the object data. Since in the example the time gap TL between the following object 14 and the further object 5 is below the limit, the further object 5 is also classified as a following object 14. The warning is also output for this following object 14. The warning is thus output until the last detected following object 14 has left the warning zone 15. Thus, for a column that contains the first object 13 and at least one following object 14, the urgent warning is not output continuously. This means that when a column of vehicles passes by, the occupant is not disturbed and/or unsettled by a persistent urgent warning.

The invention claimed is:

1. A method for assisting an occupant when exiting a vehicle, the method comprising:
    receiving opening data describing an imminent opening of a door of the vehicle by the occupant;
    receiving object data describing positions and speeds of objects in an environment of the vehicle;
    determining a time-to-collision between the opening of the door and a possible collision of a first object with the door, based on the opening data and the object data;
    outputting an urgent warning signal if the time-to-collision falls below a predetermined minimum duration;
    using the object data to check whether the first object is followed by a second object;
    classifying the second object as a first following object if a time-gap between the first object and the second object is below a predetermined limit; and
    outputting a warning signal after the output of the urgent warning signal in the event that the second object is classified as the first following object.

2. The method of claim 1, further comprising
    using the object data to check whether the first following object is followed by a third object;
    classifying the third object as a second following object if the time-gap between the first following object and the third object is below the predetermined limit; and
    outputting a further warning signal after the output of the warning signal in the event that the third object is classified as the second following object.

3. The method of claim 1, wherein the warning signal is output as long as the first following object is located in a predetermined danger zone in the environment of the vehicle.

4. The method of claim 1, wherein the urgent warning signal is output as long as the first object is located in the predetermined danger zone in the environment of the vehicle.

5. The method of claim 1, wherein the second object is prevented from being classified as the first following object if the second object follows the first object and the time-gap between the first object and the second object exceeds the predetermined limit.

6. The method of claim 2, wherein the third object is prevented from being classified as the second following object if the third object follows the second object and the time-gap between the third object and the second object exceeds the predetermined limit.

7. The method of claim 1, wherein, using the object data, an object list is created to identify and/or classify the objects detected in the environment.

8. A computing device for a driver assistance system of a vehicle, the computing device comprising:
    a processor; and
    a memory, wherein the memory includes software that, when executed by the processor configures the processor to carry out the method of claim 1.

9. A driver assistance system for a vehicle, comprising:
    an environment sensor configured to detect objects in an environment of the vehicle;
    a door sensor configured to detect an imminent opening of a door of the vehicle;
    a warning device configured to output a warning or an urgent warning; and
    a computing device configured to control the environment sensor, the door sensor and the warning device so as to execute the method of claim 1.

10. A non-transitory computer readable medium that includes software instructions which, when executed by a computer, cause the computer to carry out the method of claim 1.

* * * * *